(12) United States Patent
Forsberg

(10) Patent No.: US 7,634,847 B2
(45) Date of Patent: Dec. 22, 2009

(54) APPARATUS AND METHOD FOR MANUFACTURING AND ASSEMBLING STERILE CONTAINERS

(76) Inventor: Erik Forsberg, R.R. #1, 6559 Highway No. 9, Caledon East, Ontario (CA) L0N 1E0

( * ) Notice: Subject to any disclaimer, the term of this patent is extended or adjusted under 35 U.S.C. 154(b) by 573 days.

(21) Appl. No.: 11/040,096

(22) Filed: Jan. 24, 2005

(65) Prior Publication Data

US 2005/0235474 A1 Oct. 27, 2005

Related U.S. Application Data

(63) Continuation of application No. PCT/CA03/01065, filed on Jul. 24, 2003.

(60) Provisional application No. 60/398,015, filed on Jul. 24, 2002.

(51) Int. Cl.
*B23P 25/00* (2006.01)
*B23P 21/00* (2006.01)

(52) U.S. Cl. .......................... 29/428; 29/527.1; 29/773; 264/268

(58) Field of Classification Search .................. 29/428, 29/455.1, 527.1, 722, 773, 783, 786, 801; 264/268
See application file for complete search history.

(56) References Cited

U.S. PATENT DOCUMENTS

| | | | | | |
|---|---|---|---|---|---|
| 4,432,755 | A | * | 2/1984 | Pearson | 141/329 |
| 4,530,202 | A | * | 7/1985 | Powell et al. | 53/426 |
| 4,636,391 | A | | 1/1987 | Pike | |
| 4,783,056 | A | | 11/1988 | Abrams | |
| 4,880,581 | A | * | 11/1989 | Dastoli et al. | 264/39 |
| 5,804,744 | A | * | 9/1998 | Tan et al. | 73/864.34 |

FOREIGN PATENT DOCUMENTS

WO  WO 97/07955 A1  3/1997

\* cited by examiner

*Primary Examiner*—Jermie E Cozart
(74) *Attorney, Agent, or Firm*—Santosh K. Chari; Blake, Cassels & Graydon LLP

(57) ABSTRACT

A system and method for manufacturing sterile containers such as specimen containers includes one or more moulding machines to manufacture vials and cooperating caps from thermoplastic materials. After moulding and cooling the vials and caps are transported under sterile conditions to an assembly station where the caps and vials are combined to form closed containers. By maintaining the sterile conditions between manufacture and assembly of the container parts, the interior of the container is also maintained sterile thereby avoiding the need for further, post production sterilization.

14 Claims, 1 Drawing Sheet

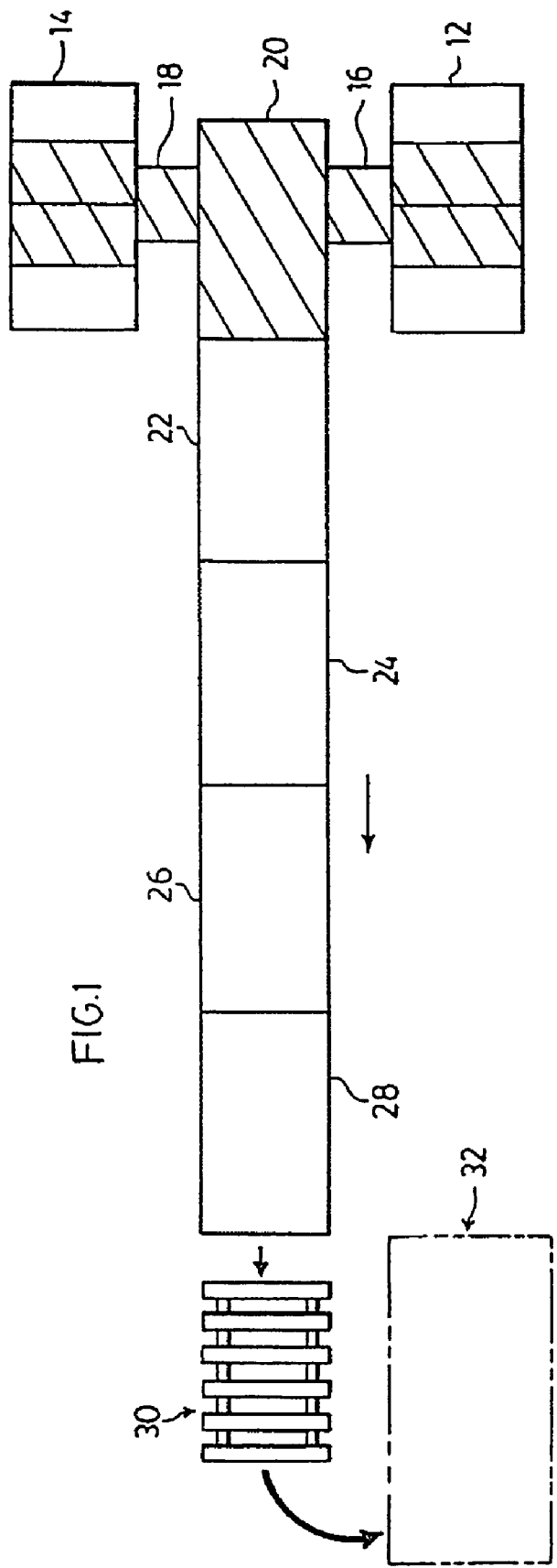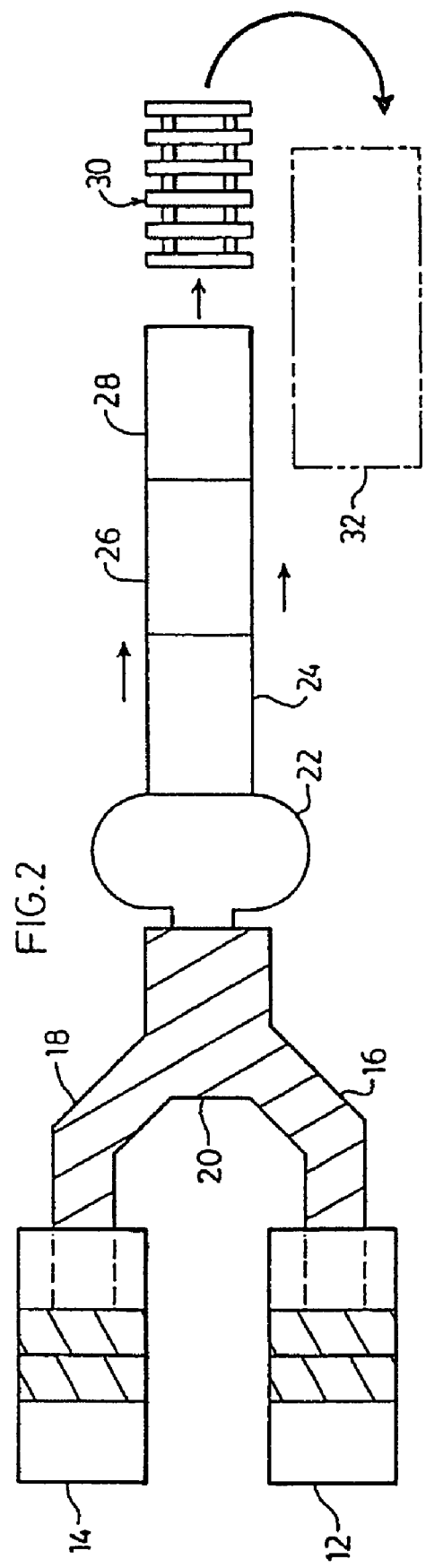

APPARATUS AND METHOD FOR MANUFACTURING AND ASSEMBLING STERILE CONTAINERS

This is a Continuation of PCT Application No. PCT/CA2003/001065 filed on Jul. 24, 2003, which claims priority from U.S. Provisional Application No. 60/398,015, filed on Jul. 24, 2002.

BACKGROUND OF THE INVENTION

1. Field of the Invention

The present invention relates to processes for manufacturing sterile specimen containers. More specifically, the invention relates to a process for manufacturing specimen containers that incorporates a sterilisation stage, no longer requiring the outsourcing of sterilisation and costs associated therewith.

2. Description of the Prior Art

The medical industry utilises vast numbers of sterile specimen containers. The manufacturing process currently used to create these sterile containers lacks efficiency. This invention relates to the efficient production of sterile specimen containers.

Present sterile specimen container manufacturing processes lack an internal sterilisation step, and thus require added transportation, warehousing, and labour, as well as other logistical considerations to accommodate the outsourcing needed. Use of an outside firm to perform the sterilisation procedure increases the time and cost required to produce sterile specimen containers.

Commonly manufactured by thermoplastic and injection moulding systems, sterile specimen containers are fabricated in two separate parts. A thermoplastic polymer is used for the vial, while a thermoplastic resin is used for the cap. The current manufacturing practice involves separate moulding of vial and cap, at which point the two are separately cased and warehoused. When needed, the two components are pulled from storage, transported back to the plant, and loaded onto the capping line, where they are joined and proceed to be labelled, bagged, cased and returned to storage. Prom this warehousing juncture, the completed containers are shipped to a sterilisation facility for the final processing step of sterilisation. The sterile containers, in final product format, are shipped to the warehouse, after which point they are passed on to the distributor, followed by the end user.

The numerous warehousing terms required throughout the production lifecycle, along with the sterilisation procedure, constitutes a great portion of the total manufacturing time and cost. Further facilities for sterilizing items such as the containers discussed above are highly capital intensive and, therefore, only a few such facilities exist. As such, transport to and from these facilities poses various difficulties to a manufacturer. Thus, significant cost savings can be realized by avoiding the need for sterilizing containers at a different facility. These costs are generally attributable to labour, logistics, and overall supply chain management.

A production method which could be applied to eliminate the external outsourcing of sterilisation is proposed by Pike in U.S. Pat. No. 4,636,391. Pike teaches a process for creation of a thermoplastic film tube by extrusion. The tube itself is created at a sterilising temperature, 600 degrees Fahrenheit or greater, by the film extruder. The resultant sterile tube is kept within a sterile environment, until the point at which it is filled with a sterile product and sealed, preserving inner sterility. This reference teaches the employment of a sterilising process to eliminate the necessity of subsequent sterilisation steps. However, this reference does not suggest a method for producing sterile specimen containers or similar containers requiring sterile interiors.

SUMMARY OF THE INVENTION

Thus, in one embodiment, the invention provides a system for manufacturing sterile containers comprising:

a) at least one moulding device to mould a cap and a vial, the combination of which forms the container, the at least one moulding device having an exit port from which the formed caps and vials exit;

b) a transport means for transporting the caps and vials from the exit port to an assembly station for assembling the caps and vials to from the closed containers;

c) a sealed area surrounding the exit port and the assembly station, wherein the sealed area is maintained sterile.

In another embodiment, the invention provides a method for manufacturing sterile containers comprising:

a) moulding components for the container in at least one moulding device;

b) transporting the components from the at least one moulding device to an assembly station;

c) assembling the components to form the container; wherein, the components are maintained in a sterile environment until assembled.

BRIEF DESCRIPTION OF THE DRAWINGS

These and other features of the preferred embodiments of the invention will become more apparent in the following detailed description in which reference is made to the appended drawings wherein:

FIG. 1 is a schematic view of the apparatus of the invention according to one embodiment.

FIG. 2 is a schematic view of the apparatus of the invention according to a second embodiment.

DESCRIPTION OF THE PREFERRED EMBODIMENTS

The invention depicted in FIG. 1 details a manufacturing assembly line for the production of sterile specimen containers. The container is formed in two separate parts, the cap and vial, by two moulding machines 12, 14, generally located in close proximity to one another. The caps and vials are provided with corresponding threaded portions so as to enable the caps to be screwed on to the opening of vials. This feature is known in the art.

The caps and vials created by the moulding machines 12, 14 are then joined or combined together at a capping station 20 to create the complete, or closed container. The closed container then proceeds through the remainder of the manufacturing line, described below, to create a complete and shippable product package of sterile specimen containers. At the capping station, the caps are screwed on to the vials preferably using robotic devices as are known in the art.

In the embodiment shown in FIG. 1 both the separate cap and vial production lines 12 and 14, include conveyors 16, 18 that transport the containers to the capping station 20. At the capping station 20 the vial and cap components are received from the conveyors 16, 18 and are joined to create a complete specimen container. In a preferred embodiment, the capped vials continue onto an accumulator 22 which serves as a waiting station, should any complications or disruptions take place at a subsequent location in the manufacturing line. An example of a disruption is the depletion of labels to be applied to the containers, which would require re-supplying such labels. The accumulator 22 serves to hold, or buffer the assembled containers until the difficulty is corrected, so as not to require stoppage of the production lines that form the caps and vials.

From the accumulator 22, the vials are transported to a labelling station 24, where appropriate labels can be applied to the containers. It will be appreciated that labelling of the containers, although preferred, is not necessarily required depending upon the purpose of the containers. The labelled containers may then move from the labelling station 24 to a bagging station 26, where they are placed in numbers into large bags. These bags continue from the bagging station 26 to a boxing station 28, where they are grouped together and placed into large boxes for ease of transport and storage. Once boxed, the boxed containers move to a pallet arrangement 30 where they are arranged and then shipped to an offsite warehouse location 32. It will be appreciated that the bagging and boxing functions are preferred and commonly known in the art. In other embodiments of the invention, such steps may be omitted.

The thermoplastic moulding procedure can be performed according to any known method familiar to those skilled in the field. The moulding stations 12 and 14 which perform this procedure, are maintained at high temperatures in order to achieve the necessary conditions for melting and moulding the thermoplastic material to form the cap and vial components. Temperatures over 200° C. are common, while the exact temperature is variable and dependent on the material, equipment and numerous other conditions of production. At such temperatures, it is not possible for any microbial contaminant to survive. For this reason, the container elements (i.e. vial and cap) are sterile at the time they are formed. To form the cap and vials, rapid cooling of the thermoplastic containing moulds is performed, which causes the thermoplastic to harden and stabilise. Under these cooled conditions, the caps and vials would normally be exposed to non-sterile air, thereby becoming non-sterile themselves. For this reason, the present invention provides a local sterile environment from the moulding machines 12, 14, to conveyors 16, 18 to the capping station 20. This locally maintained sterile environment ensures the sterility of the vial and cap components from the point at which they leave the sterile conditions until that point at which the cap and vial are fastened or joined to create the closed container.

The sterile environment situated in post-moulding to pre-capping areas can be established according to methods as known in the construction of clean rooms and the like. In one preferred embodiment, a high efficiency filter designed to prevent passage of microbes and any potential contaminants can be utilised. As an example, the sterile environment can be preserved through the use of a High Efficiency Particulate Arrestance (HEPA) filter to produce purified air. The HEPA filter serves to purify the air by removing particulate matter, including bacterial, fungal and other opportunistic microbiologicals from the air. The purified air is preferably provided in a low pressure laminar flow. The laminar flow will cause an outflow of air through grates supplied at the underside of the arrangement, and where the container leaves the capping station 20. The maintenance of this steady laminar flow will ensure that while sterile air is able to flow freely into non-sterile areas, non-sterile air is unable to flow into sterile areas. Thus in one preferred embodiment, the sterile environment will be pressurised at least slightly higher than its surroundings, to ensure that any air flow will be from the sterile area to the non-sterile area, and not in the opposite direction. Containment of the sterile environment can be achieved through various methods, including, for example, a curtain partition.

In the embodiment illustrated in FIG. 2 both the separate cap 12, and vial 14 production lines lead along vertically angled conveyors 16, 18, down to the capping station 20. The arrangement, in its preferred embodiment, continues onto the accumulator 22, and in all cases moves forward to labelling 24, bagging 26, and boxing 28 stations, succeeded by a pallet arrangement 30 and shipment to an offsite warehouse location 32.

Thus the present invention provides a process for the manufacture of a complete and sterile specimen container. With specific reference to the embodiment shown in FIGS. 1 and 2, the manufacturing process comprises the steps of:

a) providing a cap moulding machine 12, that by a thermoplastic moulding procedure along with an input of a thermoplastic resin, such as high-density polyethylene, produces an output of sterilised caps;

b) providing a vial moulding machine 14, that by a thermoplastic moulding procedure along with an input of a thermoplastic polymer, such as clarified polypropylene or crystal styrene, produces an output of sterilised vials;

c) providing a means to transport the formed caps and vials to a capping station;

d) transporting the caps from the cap moulding machine 12, along the conveyor 16, and vials from the vial moulding machine 14, along the conveyor 18, to the capping station 20, where the caps and vials are combined to create a complete container;

d) maintaining a sterile environment, schematically represented with the patterned areas, from the point at which the cap or vial leave the moulding machine 12, 14, along the conveyers 16, 18, to the point at which a secure connection has been made between the two at the capping station 20, to assure that a sterile environment is created within the container;

e) the sterile environment is preferably maintained only locally, directly around the equipment where required, to eliminate the need for a large scale clean room environment and those precautions and costs necessary for its maintenance;

f) transporting the assembled container from the capping station 20 to the accumulator 22, found in the preferred embodiment of the invention, to accommodate any backups downstream in the processing line, thereby avoiding the need to halt production;

g) transporting the assembled containers from the accumulator 22 to the labelling station 24 where appropriate labels are applied;

h) transporting the assembled containers to the bagging station 26, where the containers are grouped and inserted into bags;

i) from the bagging station 26, the bags containing numerous containers are then placed into boxes at the boxing station 28, for convenient transportation and storage;

j) once boxed, the boxed containers are placed upon pallets 30 for transportation, to the warehouse 32 until needed;

Since upon exciting the capping station 20, the containers no longer needs to be held within a sterile environment, the accumulator 22, labelling 24, bagging 26, boxing 28, pallet region 30, and warehousing 32, and all those areas in between need not be maintained sterile.

Much like the embodiment shown in FIG. 1, the embodiment of FIG. 2 illustrates a nearly identical procedure. FIG. 2 has a deviation which lies between the point where the cap and vial leave the moulding machines 12, 14, to the point at which they reach the capping station 20. FIG. 2 embodies an arrangement where the cap and vial drop from the moulding machines 12, 14 and are transported along vertically angled conveyors 16, 18 to the capping arrangement 20, where a secure connection is made between the two.

Thus the present invention provides, in both embodiments, a process for the manufacture of a complete and sterile specimen container.

The above described production method, by incorporating sterilisation into the manufacturing process, eliminates sterilisation outsourcing and costs associated therewith, including logistic co-ordination between the sterilisation site and manufacturing warehouse, and those costs associated with the excessive handling created of the previous method. The present process will allow for enhanced supply chain management, as a real time supply system governed by supply on demand principles can be implemented. This will further reduce warehousing costs, the risk of over/underproduction, and any concerns of obsolescence.

In other embodiments, the conveyors 16 and 18 can be replaced with ramps or slides or other such transport mechanisms as will be apparent to persons skilled in the art. In another embodiment, the conveyors 16 and 18 can be replaced with robotic arms and the like.

In another embodiment, various numbers of the vials and caps can be moulded simultaneously. Further, the caps and vials can be moulded in the same moulding machine or station.

In another embodiment, the caps and vials described above may be of a "snap on" type thereby not requiring any threaded portions.

Although the invention has been described with reference to certain specific embodiments, various modifications thereof will be apparent to those skilled in the art without departing from the spirit and scope of the invention as outlined herein.

I claim:

1. A system for manufacturing sterile thermoplastic containers, each of said containers comprising a vial and a cooperating cap, the vial and cap being adapted to be combined to form a sealed container, the system comprising:
   a) a cap moulding device for moulding said caps from a molten thermoplastic material and a vial moulding device for moulding said vials from a molten thermoplastic material, said moulding devices each having an exit port from which the formed caps and vials exit;
   b) a transport means for transporting said caps and vials from said respective exit port to an assembly station;
   c) the assembly station comprising a robotic assembly device for assembling said caps and vials to form closed sterile containers;
   d) a sealing means for forming a single sealed sterile area surrounding the exit ports of the cap and vial moulding machines and said assembly station.

2. The system of claim 1 wherein said transport means comprises conveyors.

3. The system of claim 1 wherein the sealed area comprises a walled enclosure enclosing at least said exit ports and the assembly station.

4. The system of claim 1 further comprising a pressurizing means for providing pressurized sterile air within the sealed sterile area and for establishing a pressure within the area greater than the pressure outside the area.

5. The system of claim 4 wherein said pressurizing means provides sterile air in a pressurized laminar flow into the sealed sterile area.

6. The system of claim 1 further comprising an accumulator, located externally of the sealed sterile area, for collecting the closed sterile containers for further processing.

7. The system of claim 1 further comprising a bagging station, located externally of the sealed sterile area, for receiving the closed sterile containers and for bagging said containers.

8. The system of claim 1 further comprising a labeling station, located externally of the sealed sterile area, for receiving the closed sterile containers and for labeling said containers.

9. The system of claim 1 wherein said transport means is chosen from the group consisting of conveyors, ramps, and robotic arms.

10. A method for manufacturing sterile thermoplastic containers, each of said containers comprising a vial and a cooperating cap, the vial and cap being adapted to be combined to form a sealed container, the method comprising:
    a) moulding said vials and caps from molten thermoplastic materials in respective first and second moulding devices;
    b) transporting the said vials and caps from said respective moulding devices to an assembly station;
    c) assembling the vials and caps to form said containers;
    wherein,
    the vials and caps are assembled by robotic means provided in the assembly station; and
    the vials and caps are maintained in a sterile environment until assembled by maintaining the caps and vials in a single sterile enclosure surrounding the exit ports of the first and second moulding devices and the assembly station.

11. The method of claim 10 wherein said sterile enclosure is pressurized by a laminar flow of sterile air.

12. The method of claim 10 further comprising the step of accumulating the closed sterile containers in an accumulator located externally of the sealed sterile enclosure for further processing.

13. The method of claim 10 further comprising the step of bagging the closed sterile containers in a bagging station located externally of the sealed sterile enclosure.

14. The method of claim 10 further comprising the step of labeling the closed sterile containers in a labeling station located externally of the sealed sterile enclosure.

* * * * *